(12) United States Patent
Priebe et al.

(10) Patent No.: US 9,000,067 B2
(45) Date of Patent: Apr. 7, 2015

(54) BINDER CONTAINING SUBSTITUTED BENZENES AND NAPHTHALENES FOR PRODUCING CORES AND MOLDS FOR METAL CASTING, MOLD MATERIAL MIXTURE, AND METHOD

(75) Inventors: Christian Priebe, Wülfrath (DE); Diether Koch, Mettmann (DE)

(73) Assignee: Ask Chemicals GmbH, Hilden (DE)

( * ) Notice: Subject to any disclaimer, the term of this patent is extended or adjusted under 35 U.S.C. 154(b) by 74 days.

(21) Appl. No.: 13/877,061

(22) PCT Filed: Sep. 30, 2011

(86) PCT No.: PCT/DE2011/001789
§ 371 (c)(1),
(2), (4) Date: May 13, 2013

(87) PCT Pub. No.: WO2012/041294
PCT Pub. Date: Apr. 5, 2012

(65) Prior Publication Data
US 2013/0299120 A1    Nov. 14, 2013

(30) Foreign Application Priority Data

Sep. 30, 2010  (DE) .......................... 10 2010 046 981

(51) Int. Cl.
| | | |
|---|---|---|
| B22C 1/22 | (2006.01) | |
| C08K 5/00 | (2006.01) | |
| C08L 75/04 | (2006.01) | |
| C08K 5/01 | (2006.01) | |
| C08G 8/28 | (2006.01) | |
| C08G 18/54 | (2006.01) | |
| C08G 18/08 | (2006.01) | |

(52) U.S. Cl.
CPC ............. B22C 1/2273 (2013.01); C08K 5/0008 (2013.01); C08L 75/04 (2013.01); C08K 5/01 (2013.01); B22C 1/2246 (2013.01); B22C 1/2253 (2013.01); C08G 8/28 (2013.01); C08G 18/54 (2013.01); C08G 18/0852 (2013.01)

(58) Field of Classification Search
CPC ...... C08G 18/542; C08K 5/0008; C08K 5/01; C08L 75/04; B22C 1/2273

USPC .................................................. 523/142, 143
See application file for complete search history.

(56) References Cited

U.S. PATENT DOCUMENTS

| | | | |
|---|---|---|---|
| 3,409,579 A | 11/1968 | Robins | |
| 3,485,797 A | 12/1969 | Robins | |
| 3,632,844 A | 1/1972 | Robins | |
| 3,676,392 A | 7/1972 | Robins | |
| 4,268,425 A | 5/1981 | Gardikes | |
| 4,540,724 A | 9/1985 | Dunnavant | |
| 4,546,124 A | 10/1985 | Laitar | |
| 4,590,229 A | 5/1986 | Gardikes | |
| 4,602,069 A | 7/1986 | Dunnavant | |
| 4,634,758 A | 1/1987 | Laitar | |
| 4,657,846 A * | 4/1987 | Kokubo et al. ............... 430/434 |
| 5,447,968 A | 9/1995 | Barnett | |
| 6,136,888 A | 10/2000 | Torbus | |

FOREIGN PATENT DOCUMENTS

| | | |
|---|---|---|
| EP | 1375028 A1 | 1/2004 |
| EP | 1137500 B1 | 3/2004 |
| JP | 3794944 B2 | 4/2006 |
| WO | 2008017476 A1 | 2/2008 |

OTHER PUBLICATIONS

Machine translation of JP 2002-113549 A, Apr. 16, 2002.*

* cited by examiner

*Primary Examiner* — Vickey Nerangis
(74) *Attorney, Agent, or Firm* — Standley Law Group LLP

(57) ABSTRACT

A binder for mold material mixtures is a four-component material. It contains at least one phenolic resin component, at least one isocyanate component, at least one alkyl/alkenyl benzene and at least one dialkylated and/or dialkenylated naphthalene. The phenolic resin component acts as the polyol component and contains phenolic resin obtainable from the reaction between a phenol compound and an aldehyde compound. The isocyanate component contains at least one polyisocyanate with at least two NCO groups per molecule. The alkyl/alkenyl benzene has a boiling point above 250° C. The dialkylated and/or dialkenylated naphthalene has a boiling point above 270° C.

21 Claims, No Drawings

BINDER CONTAINING SUBSTITUTED BENZENES AND NAPHTHALENES FOR PRODUCING CORES AND MOLDS FOR METAL CASTING, MOLD MATERIAL MIXTURE, AND METHOD

CROSS-REFERENCE TO RELATED APPLICATIONS

This application is a national stage entry of PCT/DE2011/001789, filed 30 Sep. 2011, which claims a right of priority under 35 USC §119 from German patent application 10 2010 046981.5, filed 30 Sep. 2010, the content of which is incorporated by reference as if fully recited herein.

TECHNICAL FIELD

The present invention relates to a polyurethane-based binder for producing cores and casting molds containing alkyl/alkenyl benzenes and at the same time dialkylated and/or dialkenylated naphthalenes with delayed curing of the uncatalyzed mold material mixture, particularly for cold box mixtures.

BACKGROUND OF THE ART

The core production method known by the names "cold box method" or "Ashland method" has become very important in the foundry industry. In this method, two-component polyurethane systems are used to bind a refractory mold base material. The polyol component consists of a polyol having at least two OH groups per molecule, the isocyanate component consists of a polyisocyanate having at least two NCO groups per molecule. The binder system is cured with the aid of basic catalysts. Liquid bases can be mixed with the binder system before the molding process to bring the two components to reaction (U.S. Pat. No. 3,676,392). Another option is to pass gas-phase tertiary amines through the molding material-binder material mixture after the molding process (U.S. Pat. No. 3,409,579).

According to U.S. Pat. No. 3,676,392 and U.S. Pat. No. 3,409,579, phenolic resins that are obtained in the liquid phase by condensing phenol with aldehydes, preferably formaldehyde, at temperatures up to about 130° C. in the presence of catalytic quantities of metal ions are used as the polyols. The production of such phenolic resins is described in detail in U.S. Pat. No. 3,485,797. Substituted phenols, preferably o-cresol and p-nonylphenol, may be used as well as unsubstituted phenol (compare for example U.S. Pat. No. 4,590,229). According to EP 0177871 A2, phenolic resins that have been modified with aliphatic monoalcohols containing one to eight carbon atoms are used as a further reaction component. Alkoxylation is intended to lend the binder systems greater thermal stability.

The most frequently used solvents for the polyol component are mixtures of polar solvents with high boiling point (for example esters and ketones) and aromatic hydrocarbons with high boiling point. On the other hand, the polyisocyanates are preferably dissolved in aromatic hydrocarbons with high boiling point.

In EP 0771599 A1 and WO 00/25957 A1, formulations are described with which the use of fatty acid esters renders aromatic solvents entirely or at least largely unnecessary.

For a variety of reasons, it is desirable that such mold material mixtures have a very long processing time, that is to say the two components only react with one another when they come into contact with a catalyst. Even though many advances have been made in this regard since the invention of the "cold box method", for example with the addition of phosphorus halides to the polyisocyanate component described in U.S. Pat. No. 4,540,724, even mold material mixtures produced with modern binder formulations have a limited useful life. This becomes evident as the molds and cores lose mechanical strength with the increasing age of the mold material mixtures, and after a certain time they fail to reach the value required to ensure safe handling and a good casting result. Japanese document JP 3794944 B2 suggests adding $C_6$-$C_{16}$-alkylbenzenes to prevent the mold material mixture from hardening prematurely.

One practical consequence of premature hardening is that relatively large quantities of mold material mixtures that have become unusable, after unforeseen interruption in production, for example, periodically have to be disposed of. The effort involved in cleaning machinery, supply and transport containers becomes particularly substantial when the mold material mixtures are no longer soft and flowable, but have (partially) hardened at the time of cleaning.

Users would therefore like to have mold material mixtures provided to them that not only have a very long processing time but also do not harden to form a solid mass after the processing time has elapsed. The mold material mixtures should still be soft and flowable then, so that the core machines are easy to clean.

SUMMARY

The object underlying the invention was therefore to provide foundries with a mold material mixture for producing molds, in which uncatalyzed hardening does not occur at all, or only to a very limited degree, so that the mixture remains soft and flowable even after several hours.

It was then discovered, surprisingly, that hardening of an uncatalyzed cold box mixture is delayed for even longer when alkyl/alkenyl benzenes are added in conjunction with dialkylated and/or dialkenylated naphthalenes as described in the claims than when the same quantity of either of the two substance groups is added alone.

According to the invention, the alkyl and/or alkenyl chains of the alkyl/alkenyl benzenes and the dialkylated/dialkenylated naphthalenes have the following features independently of each other: they are

- even-numbered or odd-numbered;
- saturated or unsaturated, preferably saturated, with 8 to 20 C atoms (alkyl/alkenyl benzenes) and 2 to 10 C atoms (dialkylated/dialkenylated naphthalenes); branched or unbranched; and/or
- substituted or unsubstituted, wherein the substitution consists of one or more phenyl rings.

The aromatic body may be monosubstituted or polysubstituted, and the alkyl/alkenyl substituents may be different on the same body.

The naphthalenes are dialkylated and/or dialkenylated, preferably each with 2 to 10 C atoms, such as diisopropyl naphthalene for example.

The weight proportions of alkyl/alkenyl benzenes (C) to dialkylated and/or dialkenylated naphthalenes (D) are in the following ratios to each other: C:D:95:5 to 5:95, preferably 85:15 to 15 to 85, particularly preferably 80:20 to 20:80.

The object of the invention is thus a binder for mold material mixtures, for example in the form of a 2- or multiple component system (A) plus (B), containing (A) at least one polyol component including a polyol with at least two OH groups per molecule, wherein the polyol component comprises at least one phenolic resin, and (B) at least one isocyanate component including a polyisocyanate with at least two NCO groups per molecule, and (C) at least one alkyl/alkenyl benzene having a boiling point above 250° C. and particularly preferably above 260° C. or even above 270° C. measured according to DIN 51761, and (D) at least one dialkylated and/or dialkenylated naphthalene having a boiling point above 270° C.

besides, optionally, one or more other components such as solvents or additives, and the like. The boiling ranges include substances that decompose before they boil.

Components (C) and (D) as well as any other components such as solvents or additives in particular constitute independently of each other a component of either (A), (B) or (A) and (B). Component (C) and (D) are preferably liquid at room temperature (20° C.).

A further object of the invention are mold material mixtures according to the claims and a method for producing a casting mold element or core according to the claims. Preferred embodiments constitute the respective objects of the subordinate claims or are described hereafter.

The proportion of the alkyl/alkenyl benzene and dialkylated/dialkenylated naphthalene combination in the binder (relative to the binder as whole including any other admixtures, such as solvents, silanes or other additives), is 1 to 25% by weight, preferably 1 to 20% by weight, and particularly preferably 1 to 15% by weight.

According to one embodiment, the alkyl and/or alkenyl radicals of the one or more alkyl/alkenyl benzene(s) each has/have preferably 8 to 20 C atoms, and the radicals of the one or more dialkylated and/or dialkenylated naphthalenes each particularly has/have 2 to 10 C atoms, and are saturated or unsaturated, preferably saturated.

The alkyl/alkenyl benzenes may be or contain monoalkylated benzenes with a saturated alkyl chain of 8 to 20 C atoms, whereas the dialkylated/dialkenylated naphthalenes are preferably dialkylated naphthalenes, each of which preferably has 2 to 10 C atoms for each alkyl/alkenyl radical.

According to one embodiment, the weight proportions of alkyl/alkenyl benzenes to alkylated and/or alkenylated naphthalenes are in the following ratios to each other: 95:5 to 5:95, preferably 85:15 to 15 to 85, particularly preferably 80:20 to 20:80.

One suitable alkyl/alkenyl benzene is for example the commercial product Marlican® manufactured by Sasol Germany GmbH.

A suitable dialkylated and/or dialkenylated naphthalene is for example the commercial product Rütasolv® DI manufactured by Rutgers Kureha Solvents GmbH.

The terms "alkylated and/or alkenylated" and "alkyl/alkenyl-" each include poly-substituted aryl groups such as alkylidenes (example: —$(CH_2)_m$—) or alkenylidenes (example: —$(CH_2)_m$—CH=CH—$(CH_2)_o$—).

The invention further relates to the mold material mixtures that contain refractory mold base materials and up to 5% by weight, preferably up to 4% by weight, particularly preferably up to 3% by weight of the binder system according to the invention relative to the weight of the refractory mold base materials.

Examples of substances that may be used as refractory mold base materials in this context include quartz sand, zirconium sand or chromium sand, olivine, refractory clay and bauxite. Synthetically manufactured mold base materials such as aluminum silicate hollow spheres (also called microspheres), glass beads, granulated glass, or the spherical ceramic mold base materials known as "cerabeads" or "carboaccucast" may also be used. Mixtures of said refractory materials are also possible.

The invention also relates to a method for producing a casting mold element or a core, including (a) mixing refractory materials with the binder system according to the invention in a binding quantity of 0.2 to 5% by weight, preferably 0.3 to 4% by weight, particularly preferably 0.4 to 3% by weight, relative to the quantity of the refractory materials, to obtain a casting mixture;

(b) introducing the casting mixture obtained in step (a) into a molding tool;

(c) hardening the casting mixture in the molding tool to obtain a self-supporting casting mold element; and (d) subsequently separating the hardened casting mixture from the tool, and optionally hardening further to obtain a hard, solid, cured casting mold element.

The polyol component includes phenol-aldehyde resins, for the purposes of this document abbreviated to phenolic resins. All conventionally used phenol compounds are suitable for manufacturing the phenolic resins. Besides unsubstituted phenols, substituted phenols or mixtures thereof may also be used. The phenolic compounds are preferably unsubstituted either in both ortho positions or in one ortho and one para position. The remaining ring carbon atoms may be substituted. There are no particular limitations on the choice of substituents, provided the substituent does not negatively affect the reaction between the phenol and the aldehyde. Examples of substituted phenols are alkyl-substituted, alkoxy-substituted, aryl-substituted and aryloxy-substituted phenols.

The substituents listed in the preceding have for example 1 to 26, preferably 1 to 15 carbon atoms. Examples of suitable phenols are o-cresol, m-cresol, p-cresol, 3,5-xylenol, 3,4-xylenol, 3,4,5-trimethylphenol, 3-ethylphenol, 3,5-diethylphenol, p-butylphenol, 3,5-dibutylphenol, p-amylphenol, cyclohexylphenol, p-octylphenol, p-nonylphenol, cardanol, 3,5-dicyclohexylphenol, p-crotylphenol, p-phenylphenol, 3,5-dimethoxyphenol and p-phenoxyphenol.

Particularly preferred is phenol itself. Higher condensed phenols such as bisphenol A are also suitable. Polyvalent phenols that have more than one phenolic hydroxyl group are also suitable.

Preferred polyvalent phenols have 2 to 4 phenolic hydroxyl groups. Specific examples of suitable polyvalent phenols include pyrocatechol, resorcin, hydroquinone, pyrogallol, phloroglucin, 2,5-dimethylresorcin, 4,5-dimethylresorcin, 5-methylresorcin or 5-ethylresorcin. Mixtures of various monovalent and polyvalent and/or substituted and/or condensed phenol components may also be used to produce the polyol component.

In one embodiment, the phenols used to produce the phenolic resin component have general formula I:

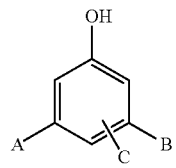

wherein A, B and C are selected independently of each other from: a hydrogen atom, a branched or unbranched alkyl radical, which may have for example 1 to 26, preferably 1 to 15 carbon atoms, a branched or unbranched alkoxy radical, which may have for example 1 to 26, preferably 1 to 15 carbon atoms, a branched or unbranched alkenoxy radical, for example 1 to 26, preferably 1 to 15 carbon atoms, an aryl or alkylaryl radical, such as bisphenyl.

Suitable aldehydes for producing the phenolic resin component are those having formula:

R—CHO, wherein R is a hydrogen atom or a carbon atom radical having preferably 1 to 8, particularly preferably 1 to 3 carbon atoms. Specific examples thereof are formaldehyde, acetaldehyde, propionaldehyde, furfurylaldehyde and benzaldehyde. Particularly preferably, formaldehyde is used, either in the aqueous form thereof, as para-formaldehyde, or as trioxane.

To obtain the phenolic resins, the number of moles of aldehyde used is preferably at least equivalent to the number of moles of the phenol component. The molar ratio of aldehyde to phenol is preferably 1:1.0 to 2.5:1, particularly preferably 1.1:1 to 2.2:1, most preferably 1.2:1 to 2.0:1.

The phenolic resin is manufactured according to processes known to someone skilled in the art. In this context, the phenol and the aldehyde are reacted in substantially anhydrous conditions, particularly in the presence of a bivalent metal ion, at temperatures preferably lower than 130° C. The resulting water is distilled off. To this end, a suitable entrainer such as toluene or xylene may be added to the reaction mixture, or the distillation is performed under reduced pressure.

The phenolic resin is selected such that crosslinking with the polyisocyanate component is possible. In order to construct a network, phenolic resins that contain molecules having at least two hydroxyl groups in the molecule are needed.

Particularly suitable phenolic resins are known by the names "ortho-ortho" or "high-ortho" novolaks or benzylether resins. These may be obtained by condensing phenols with aldehydes in a weakly acidic medium and using suitable catalysts. Catalysts suitable for producing benzylether resins are salts of bivalent ions of metals such as Mn, Zn, Cd, Mg, Co, Ni, Fe, Pb, Ca and Ba. Zinc acetate is used for preference. The quantity used is not critical. Typical quantities of metal catalyst are 0.02 to 0.3% by weight, preferably 0.02 to 0.15% by weight relative to the total quantity of phenol and aldehyde.

Resins of such kind are described for example in U.S. Pat. No. 3,485,797 and EP 1137500 B1, the disclosures of which are herewith explicitly referenced, with respect to both the resins themselves and the manufacturing method thereof.

The isocyanate component of the binder system includes an aliphatic, cycloaliphatic or aromatic polyisocyanate, preferably having 2 to 5 isocyanate groups per molecule. Mixtures of isocyanates may also be used depending on the desired properties.

Suitable polyisocyanates include aliphatic polyisocyanates such as hexamethylene diisocyanate, alicyclic polyisocyanates such as 4,4'-dicyclohexylmethane diisocyanate and dimethyl derivatives thereof. Examples of suitable aromatic polyisocyanates are toluene-2,4-diisocyanate, toluene-2,6-diisocyanate, 1,5-naphthalene diisocyanate, triphenylmethane triisocyanate, xylylene diisocyanate and methyl derivatives thereof, also polymethylene polyphenyl isocyanates. Particularly preferable polyisocyanates are aromatic polyisocyanates, most preferable are polymethylene polyphenyl polyisocyanates such as technical 4,4'-diphenylmethane diisocyanate, that is to say 4,4'-diphenylmethane diisocyanate with a component of isomers and higher homologs.

The phenolic resin component, or the isocyanate component of the binder system, is preferably used as a solution in an organic solvent or a combination of organic solvents. Solvents may therefore be required that will keep the components of the binder in a sufficiently low-viscosity state, for example. Such a state is necessary, among other reasons, in order to obtain uniform crosslinking of the refractory mold material and to ensure that it retains its pourability.

Regarding the solvents for the phenolic resin component, besides the aromatic solvents known for example by the name Solvent Naphtha, oxygen-rich, polar, organic solvents may also be used. Most suitable are dicarboxylic acid esters, glycol ether esters, glycol diesters, glycol diethers, cyclic ketones, cyclic esters (lactones), cyclic carbonates or silicic acid esters or mixtures thereof. Dicarboxylic acid esters, cyclic ketones and cyclic carbonates are used for preference.

The proportion of oxygen-rich, polar solvents in the total binder may be from 0 to 30% by weight, particularly from 1 to 30% by weight.

Preferred dicarboxylic acid esters have formula $R_1OOC$—$R_2$—$COOR_1$, wherein $R_1$ represents independently of each other an alkyl group having 1 to 12, preferably 1 to 6 carbon atoms, and $R_2$ is an alkylene group having 1 to 4 carbon atoms. Examples are dimethyl esters of carboxylic acids with 4 to 6 carbon atoms, which are available from DuPont under the name Dibasic Ester. Phthalates are also suitable.

Preferred glycol ether esters are compounds with formula $R_3$—O—$R_4$—$OOCR_5$, wherein $R_3$ represents an alkyl group with 1 to 4 carbon atoms, $R_4$ is an alkylene group with 2 to 4 carbon atoms and $R_5$ is an alkyl group with 1 to 3 carbon atoms, for example butylglycol acetate, preferred are glycol ether acetates.

Preferred glycol diesters correspondingly have general formula $R_3COO$—$R_4$—$OOCR_5$, wherein $R_3$ to $R_5$ are as defined above and the radicals are each selected independently of the others (for example propylene glycol diacetate). Glycol diacetates are preferred. Glycol diethers may be characterized by the formula $R_3$—O—$R_4$—O—$R_5$, in which $R_3$ to $R_5$ are as defined above and the radicals are each selected independently of the others (for example dipropylene glycol dimethylether).

Preferred cyclic ketones, cyclic esters and cyclic carbonates with 4 to 5 carbon atoms are also suitable (for example propylene carbonate). The alkyl and alkylene groups may each be branched or unbranched.

Fatty acid esters such as rapeseed oil fatty acid methyl ester or oleic acid butyl ester are also preferred.

Either aromatic solvents, the polar solvents named above or mixtures thereof are used as solvents for the polyisocyanate. Fatty acid esters and silicic acid esters are also suitable.

Besides the components already mentioned, the binder systems may also contain additives, for example silanes (as described in EP 1137500 B1 for example), or internal releasing agents such as fatty alcohols (as described in U.S. Pat. No. 4,602,069 for example), drying oils (as described in U.S. Pat. No. 4,268,425 for example) or complexing agents (as described in U.S. Pat. No. 5,447,968 for example) or mixtures thereof.

Suitable silanes are for example aminosilanes, epoxysilanes, mercaptosilanes, hydroxysilanes and ureidosilanes such as γ-hydroxypropyl trimethoxysilane, γ-aminopropyl trimethoxysilane, 3-ureidopropyl triethoxysilane, γ-mercaptopropyl trimethoxy-silane, γ-glycidoxypropyl trimethoxysilane, β-(3,4-epoxycyclohexyl)trimethoxysilane and N-β-(aminoethyl)-γ-aminopropyl trimethoxysilane.

In order to produce the mold material mixture, the components of the binder system may first be combined and then added to the refractory mold material. However, it is also possible to add the components of the binder to the refractory mold material together or one after the other.

The polyisocyanate is preferably used in such quantity that the number of isocyanate groups is from 80 to 120% relative to the number of free hydroxyl groups of the resin.

Standard methods may be used to ensure that the components of the mold material mixture are mixed evenly. The mold material mixture may optionally also include other conventional components such as iron oxide, ground flax fibers, wood flour granules, pitch and refractory metals.

As a further object, the invention also relates to a method for producing a mold element, comprising the steps of:
preparing the mold material mixture described above;
forming the mold material mixture to create a mold body;
curing the mold body by adding a curing catalyst.

In order to produce the mold body, first the binder is mixed with the refractory mold base material as described above to yield a mold material mixture. If the mold body is to be manufactured according to the PU-No-Bake method, a suitable catalyst may also be added to the mold material mixture at this point. For this purpose, liquid amines are preferably added to the mold material mixture. These amines preferably have a $pK_b$ value from 4 to 11. Examples of suitable catalysts are 4-alkyl pyridines wherein the alkyl group includes 1 to 4 carbon atoms, isoquinoline, aryl pyridines such as phenyl pyridine, pyridine, 2-methoxy pyridine, pyridazine, quinoline, n-methylimidazole, 4,4-dipyridine, phenylpropyl pyridine, 1-methyl benzimidazole, 1,4-thiazine, N,N-dimethyl benzylamine, triethylamine, tribenzylamine, N,N-dimethyl-1,3-propanediamine, N,N-dimethyl ethanolamine and triethanolamine. The catalyst may also be diluted if necessary with an inert solvent such as 2,2,4-trimethyl-1,3-pentanediol-diisobutyrate, or a fatty acid ester. The quantity of catalyst added is chosen in the range from 0.1 to 15% by weight relative to the weight of the polyol component.

The mold material mixture is then placed in the mold and compacted there by the usual means. The mold material mixture is then cured to form a mold body. The mold body should preferably be kept in its outer mold while it cures.

According to another preferred embodiment, curing takes place according to the PU-Cold-Box method. For this, a gas-phase catalyst is passed through the formed mold material mixture. The catalyst used may be any of the catalysts commonly used in the cold-box method. Amines are particularly preferred for use as catalysts, particularly preferably dimethyl ethylamine, dimethyl-n-propylamine, dimethyl isopropylamine, dimethyl-n-butylamine, triethylamine and trimethylamine in the gaseous phase or as an aerosol in each case.

The mold body that is produced by this method may have any shape that is generally used in foundry applications. In a preferred embodiment, the mold body has the shape of casting molds or cores.

The invention further relates to a mold body such as may be obtained by the method described in the preceding. Such a body is characterized by high mechanical stability.

The invention also relates to the use of said mold body for metal casting, particularly iron and aluminum casting.

DETAILED DESCRIPTION

In the following, the invention will be explained in greater detail with reference to preferred embodiments and experimental examples.

EXAMPLES

The polyisocyanate solutions listed in table 1 were prepared (each in % by weight, total=100):

TABLE 1

| | Comparison experiments | | | | According to the invention | | | |
|---|---|---|---|---|---|---|---|---|
| | 1.1 | 1.2 | 1.3 | 1.4 | 1.5 | 1.6 | 1.7 | 1.8 |
| Tech. polymer MDI | 80 | 80 | 80 | 80 | 80 | 80 | 80 | 80 |
| Solvent Naphtha light[a] | | | 10 | 10 | | 10 | 10 | 10 |
| Martican[b] | 20 | | 10 | | 10 | 5 | 7.5 | 2.5 |
| Rütasolv DI[c] | | 20 | | 10 | 10 | 5 | 2.5 | 7.5 |

[a] Aral Aromatics GmbH (CAS 64742-95-6) boiling point 165-180° C.
[b] Alkyl benzene ($C_{10}$-$C_{16}$), Sasol Germany GmbH
[c] Diisopropyl naphthalene, Rütgers Kureha Solvents GmbH Production of Mold Material Mixtures Examples 1 to 3

0.8 part by weight of the commercial cold-box binder part 1 Ecocure 300 WM 10 (ASK Chemicals GmbH) containing no aromatic solvents was mixed vigorously with 0.8 part by weight of each of the isocyanate solutions 1.1, 1.2 and 1.5 listed in table 1 and with 100 parts by weight H 32 quartz sand (Quarzwerke Frechen GmbH) in a laboratory mixer manufactured by Vogel & Schemmann.

200 g of each mixture were placed in separate sample jars (volume 370 ml, diameter 6 cm), which were closed tightly. The mixtures were slightly compacted by tapping the jars once against the laboratory bench. The jars were opened and turned over after defined periods. The quantity of sand that ran out was weighed; this served as an indicator of the flowability of the stored mold material mixture. The results are summarized I table 2.

Table 2 shows that the combination of alkyl benzene and dialkyl naphthalene keeps the mold material mixture flowable for longer than does either substance on its own.

TABLE 2

| | | Comparison experiments | | according to the invention |
|---|---|---|---|---|
| Loose sand [g] | Example Part 1 | 1 Ecocure 300 WM 10 | 2 Ecocure 300 WM 10 | 3 Ecocure 300 WM 10 |
| after | Part 2 | 1.1 | 1.2 | 1.5 |
| 3 hrs | | 120 | 117 | 178 |
| 5 hrs | | 87 | 109 | 164 |
| 7 hrs | | 0 | 98 | 136 |

Examples 4 to 8

The test was repeated with isocyanate solutions 1.3, 1.4, 1.6, 1.7 and 1.8. The results are summarized in table 3.

TABLE 3

| | | Comparison experiments | | according to the invention | | |
|---|---|---|---|---|---|---|
| Loose sand [g] | Example Part 1 | 4 Ecocure 300 WM 10 | 5 Ecocure 300 WM 10 | 6 Ecocure 300 WM 10 | 7 | 7 |
| after | Part 2 | 1.3 | 1.4 | 1.6 | 1.7 | 1.8 |
| 5 hrs | | 160 | 144 | 193 | 182 | 184 |
| 7 hrs | | 127 | 130 | 180 | 166 | 182 |
| 12 hrs | | 0 | 0 | 170 | 145 | 135 |

Table 3 shows that the combination of alkyl benzene and dialkyl naphthalene keeps the mold material mixtures flowable for longer than does either substance on its own even in isocyanate solutions that contain an additional solvent.

Examples 9 to 13

The test was repeated with standard commercial cold-box binder part 1 Askocure 366 (ASK Chemicals), which contains an aromatic solvent. The results are summarized in table 4.

TABLE 4

| Loose sand [g] | Example | not according to the invention | | according to the invention | | |
|---|---|---|---|---|---|---|
| | Part 1 | 9 | 10 | 11 | 12 | 13 |
| | | Askocure 366 | | Askocure 366 | | |
| after | Part 2 | 1.3 | 1.4 | 1.6 | 1.7 | 1.8 |
| 5 hrs | | 127 | 114 | 155 | 184 | 172 |
| 7 hrs | | 0 | 108 | 136 | 92 | 93 |
| 10 hrs | | 0 | 40 | 105 | 83 | 84 |
| 12 hrs | | 0 | 0 | 75 | 45 | 43 |

Table 4 shows that the combination of alkyl benzene and alkyl naphthalene keeps the mold material mixtures flowable for longer than does either substance on its own even with the cold-box binder part 1, which contains an aromatic solvent.

The invention claimed is:

1. A binder for mold material mixtures, comprising:
(A) at least one phenolic resin component as the polyol component containing phenolic resin, wherein the phenolic resin is obtained from the reaction between a phenol compound and an aldehyde compound,
(B) at least one isocyanate component containing at least one polyisocyanate with at least two NCO groups per molecule, and
(C) at least one alkyl/alkenyl benzene with a boiling point above 250° C., and
(D) at least one of: dialkylated naphthalene and dialkenylated naphthalene, each having a boiling point above 270° C.

2. The binder according to claim 1, wherein:
the one or more alkyl or alkenyl radicals of the one or more alkyl/alkenyl benzene(s) has/have 8 to 20 C atoms, and the radicals of the one or more dialkylated/dialkenylated naphthalenes each has 2 to 10 C atoms and are saturated or unsaturated.

3. The binder according to claim 2, wherein:
the alkyl/alkenyl benzenes are monoalkylated benzenes with a saturated alkyl chain of 8 to 20 C atoms.

4. The binder according to claim 1, wherein:
the dialkylated/dialkenylated naphthalenes each have 2 to 6 C atoms for each alkyl/alkenyl radical independently of each other.

5. The binder according to claim 1, wherein:
the weight proportions of alkyl/alkenyl benzenes to dialkylated/dialkenylated naphthalenes are in the following ratios to each other: 95:5 to 5:95.

6. The binder according to claim 1, wherein:
the proportion of alkyl/alkenyl benzenes and dialkylated/dialkenylated naphthalenes in combination is 1 to 25% by weight.

7. The binder according to claim 1, wherein:
the polyisocyanate is an aromatic polyisocyanate.

8. The binder according to claim 1, wherein:
the phenolic resin is obtained by reacting a phenol compound with an aldehyde compound in a weakly acidic medium and using at least one transition metal catalysts.

9. The binder according to claim 8, wherein the catalyst is a zinc compound.

10. The binder according to claim 1, wherein the phenolic resin is a benzylether resin.

11. The binder according to claim 1, wherein the phenol compound is selected from one or more members of the group consisting of: phenol, o-cresol, p-cresol, bisphenol A and cardanol.

12. The binder according to claim 1, wherein the aldehyde compound is an aldehyde having formula:

wherein R stands for a hydrogen atom or a carbon radical having preferably 1 to 8 carbon atoms.

13. The binder according to claim 1, wherein the components (A) to (C) are contained in the binder as follows:
(A) 15 to 35% by weight phenolic resin,
(B) 25 to 45% by weight polyisocyanate, and
(C)+(D) 1 to 25% by weight alkyl/alkenyl benzene in conjunction with at least one dialkylated/dialkenylated naphthalene.

14. The binder according to claim 1, further comprising one or more members from the group consisting of: additional aromatic hydrocarbons, oxygen-rich, polar, organic solvents, esters, ketones and plasticizers.

15. The binder according to claim 1, wherein 1 to 30% by weight oxygen-rich, polar, organic solvents are used as a further solvent.

16. The binder according to claim 1, wherein the binder is in the form of a 2- or multiple component system and at least one component is component (A) and at least one other component is component (B) and the at least one alkyl/alkenyl benzene and the at least one dialkylated/dialkenylated naphthalene are constituents of component (A) or component (B) or of components (A) and (B) independently of one another.

17. The binder according to claim 1, wherein
a) the alkyl/alkenyl benzene has a boiling point higher than 260° C., and
b) independently thereof the dialkylated/dialkenylated naphthalene has a boiling point higher than 270° C.

18. A mold material mixture comprising:
the binder according to one or more of the preceding claims; and
a refractory mold material, wherein the mold material contains or consists of one or more members of the group consisting of: silicon dioxide, zirconium sand, chromium sand, olivine, refractory clay, bauxite, aluminum silicate hollow spheres, glass beads, granulated glass, and synthetic ceramic mold base materials.

19. A method for producing a casting mold element or a core, comprising:
(a) mixing refractory materials with the binder according to any of claims 1 to 17 in a quantity from 0.2 to 5% by weight, relative to the quantity of the refractory materials, to obtain a casting mixture;
(b) introducing the casting mixture into a molding tool;
(c) hardening the casting mixture in the molding tool to obtain a self-supporting mold; and
(d) subsequently separating the hardened casting mold element from the tool, and optionally hardening further to obtain a solid, cured casting mold element.

20. The method according to claim 19, wherein the hardening step is achieved using a gas or aerosol selected from one or more members of the group consisting of: dimethyl ethylamine, dimethyl-n-propylamine, dimethyl isopropylamine, dimethyl-n-butylamine, triethylamine and trimethylamine.

21. The method according to claim 19, wherein a liquid catalyst is used for curing.

* * * * *